United States Patent Office 2,704,041
Patented Mar. 15, 1955

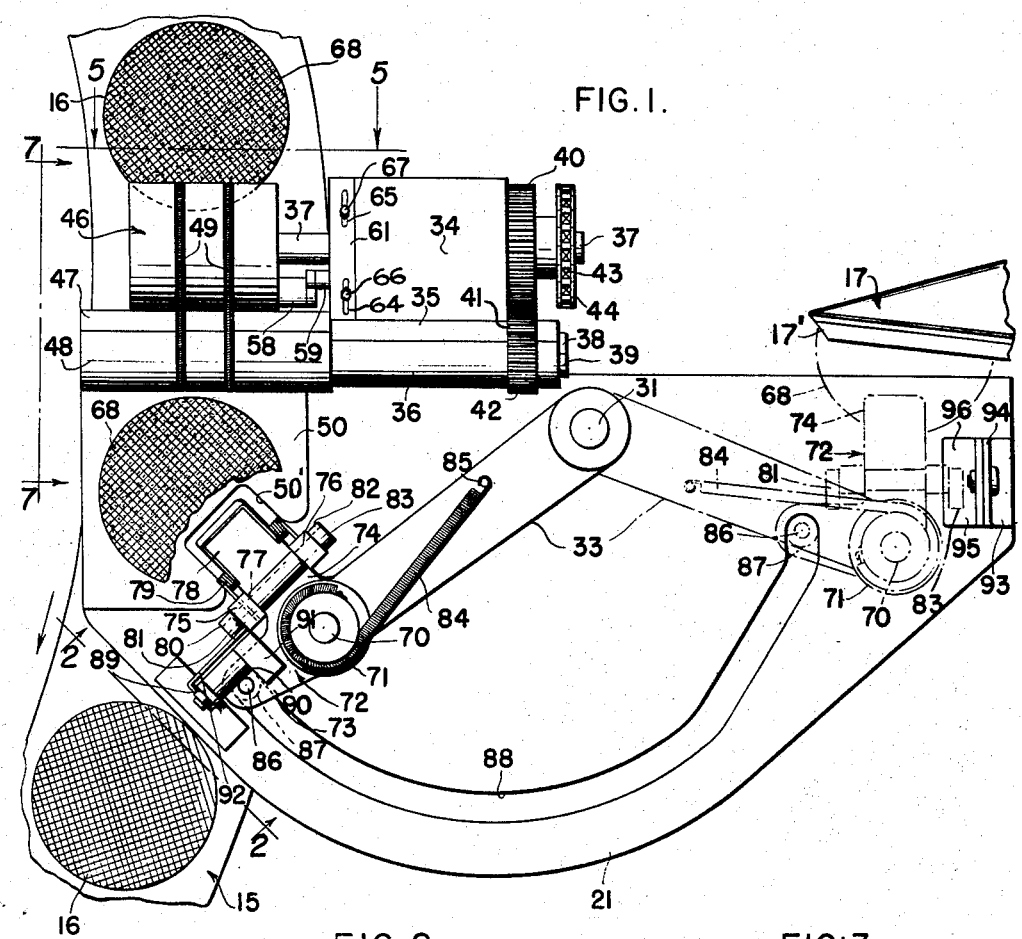

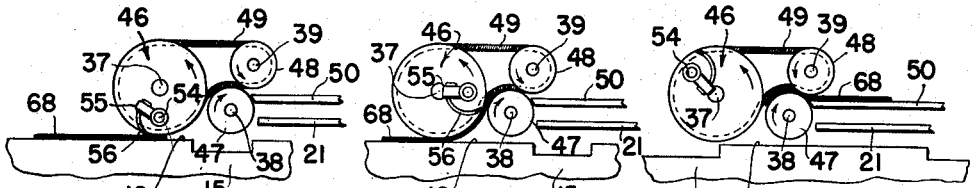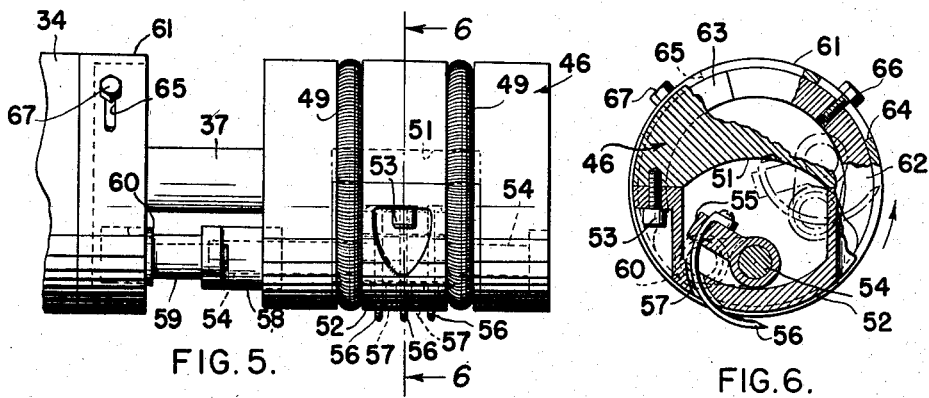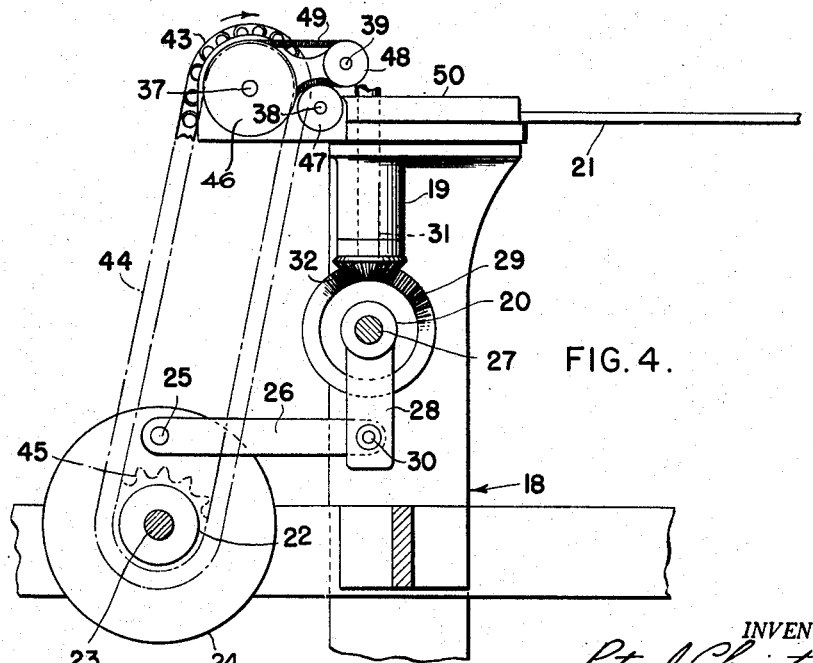

2,704,041

PICK-UP AND TRANSFER MECHANISMS FOR BAKING AND FORMING MACHINES FOR ICE CREAM CONES OR THE LIKE

Peter J. Christman, Green Bay, Wis., assignor of one-half to Thomas Lutsey, one-twelfth to Wallace P. Christman, one-twelfth to Helen C. Reince, and one-twelfth to Nancy R. Christman, all of Green Bay, Wis.

Application September 11, 1952, Serial No. 309,090

19 Claims. (Cl. 107—58)

This invention relates to improvements in pick-up and transfer mechanisms for baking and forming machines for ice cream cones or the like.

Certain types of ice cream cones are formed from circular, relatively thin waffle-like cakes which are baked between hinged complementary heated grids of waffle iron design and are then formed in the shape of cones. In one type of baking machine, a plurality of waffle irons are mounted on a circular grid supporting ring which is rotated in a horizontal plane. Each waffle iron has a base grid and a cover grid, and means is provided for lifting the cover grid to permit removal of the baked cakes from successive waffle irons as the baking ring is rotated. Means is also provided for heating the grids as the latter traverse the circular path of the grid supporting ring.

It has been standard practice, in the past, to remove the baked cakes from the waffle irons by hand and to manually transfer said cakes to the cone forming machine. Heretofore no satisfactory mechanical means has been available for removing the baked cake from the waffle iron and for transferring said cake to the cone forming machine.

It is, therefore, a general object of the present invention to provide an improved mechanism which is operable in synchronism with the cake baking machine and cone forming machine, and which is constructed to automatically pick up a baked cake from the base grid of a waffle iron of the baking machine at the discharge station of the latter and thereafter deliver said cake to the cone forming machine.

A specific object of the invention is to provide an improved mechanism of the class described having a pick-up cylinder rotatably positioned over the base grid of a waffle iron at the discharge station, said cylinder being provided with projectable and retractable cam-controlled pick-up pins which are adapted to pierce the leading edge portion of a baked cake on said grid and peel said cake from the grid as the cylinder rotates and as the grid advances, said pins being adapted to deliver the cake to the nip between a pair of delivery belts and a coacting delivery roller, and said pins being retractable into the cylinder, to strip themselves from the cake as said cylinder continues to rotate and as said cake passes between the delivery belts and roller.

Another specified object of the invention is to provide an improved mechanism of the class described wherein the baked cake is delivered by the delivery roller and belts onto a receiving table in a position to be grasped by the gripper of an oscillating transfer mechanism, said mechanism being operable to transfer the baked cake from the receiving table to the cone forming machine.

A further object of the invention is to provide an improved mechanism of the class described which can be embodied in the original manufacture of baking and forming machines, and which can also be used to convert baking and forming machines presently in use.

A further object of the invention is to provide an improved machine of the class described which is rapid, positive and efficient in operation, and which handles the baked cakes without mutilation of the latter.

With the above and other objects in view, the invention consists of the improved pick-up and transfer mechanism for ice cream cone baking and forming machines, and all of its parts and combinations, as set forth in the claims and all equivalents thereof.

In the drawings accompanying and forming a part of this specification, wherein one complete embodiment of the preferred form of the invention is shown, and wherein like characters of reference indicate the same parts in all of the views:

Fig. 1 is a plan view showing the improved pick-up and transfer mechanism associated with a baking and a forming machine;

Fig. 2 is a fragmentary side view, on an enlarged scale, of the improved mechanism taken approximately along the line 2—2 of Figure 1, and showing the upper jaw of the cake gripper closed on a baked cake, the latter being positioned on the receiving table;

Fig. 3 is a view similar to Fig. 2 showing the upper jaw of the cake gripper in the raised position which it assumes as it approaches the receiving table;

Fig. 4 is a side view of the improved mechanism showing the drives for the pick-up mechanism as well as for the oscillating transfer arm;

Fig. 5 is a fragmentary side view of the pick-up cylinder and cam for controlling the latter, said view being taken approximately along the line 5—5 of Fig. 1;

Fig. 6 is a vertical sectional view of the mechanism shown in Fig. 5, said view being taken approximately along the line 6—6 of Fig. 5 parts being broken away; and Figs. 7, 8 and 9 are semi-diagrammatic views taken approximately along the line 7—7 of Fig. 1 showing the operation of the pick-up and delivery mechanism in relation to a cake which is being acted upon thereby.

Referring more particularly to Fig. 1 of the drawings, the number 15 indicates a supporting or baking ring, which is rotatably mounted in a horizontal plane, and on which a plurality of spaced, elevated waffle-iron-type grids 16 are supported. The supporting ring 15 is also provided with complementary cover grids (not shown) one hinged to each of the grids 16. Suitable means is also provided for heating the grids 16. The supporting ring 15 and grids 16 form part of a conventional ice cream cone cake baking machine which machine is also provided with means for rotating the ring 15 in the direction indicated by the arrow in Fig. 1. The numeral 17 indicates a portion of a cone forming machine which is adapted to form into conical shape, cakes which have been baked on the grids 16.

Referring now to Fig. 4, the numeral 18 indicates a supporting framework provided with a vertical bearing 19 and with a horizontal bearing 20. The frame 18 supports a horizontal plate 21 positioned in a plane above and closely adjacent the plane of the grids 16. As shown in Fig. 1 the plate 21 extends over the supporting ring 15 and also extends adjacent the forming machine 17.

Mounted in a suitable bearing 22 on frame 18 is a main drive shaft 23 which is connected to a suitable source of power (not shown) and to the drive mechanism for the cone forming machine 17, so that the operation of said machines is synchronized in timed relationship. A wheel 24 is fixed on shaft 23, and pivoted to wheel 24 adjacent the periphery as at 25, is a link 26. A horizontal shaft 27 is rotatably mounted in bearing 20, and fixed on said shaft is a crank arm 28 and beveled gear 29. The link 27 is pivotally connected to the crank arm 28 as at 30.

A shaft 31 is rotatably mounted in bearing 19 and fixed to the lower end of said shaft is a beveled gear 32 which meshes with beveled gear 29. Shaft 31 extends through a suitable aperture in plate 21, and fixed to the upper end of said shaft is a horizontally extending arm 33, the latter being spaced above the plate 21. It is apparent that rotation of shaft 23 and wheel 24 causes rocking of crank arm 28 and shaft 27, which in turn causes partial rotation of the shaft 31, first in one direction and then in the other. This partial rotation of shaft 31 swings the arm 33 between the solid line position of Fig. 1 and the dot and dash position therein.

Suitably supported on frame 18 adjacent the annular supporting ring 15 and plate 21 are bearings 34, 35 and 36, and rotatably mounted in said bearings are horizontal shafts 37, 38 and 39 respectively, which shafts extend transversely across and above supporting ring 15 and grids 16. Spur gears 40, 41 and 42 are fixed respectively on shafts 37, 38 and 39, the gear 41 meshing with gears 40 and 42. A sprocket 43 is fixed on shaft 37, and an endless chain 44 connects the sprocket 43 with a sprocket 45 fixed on main drive shaft 23. Thus shafts 37, 38 and 39 are driven in timed relationship with main drive shaft 23.

Mounted on the shaft 37 over the path of the grids 16 is a pick-up cylinder 46, and fixed on shafts 38 and 39 adjacent the cylinder 46 are cylindrical delivery rollers 47 and 48 respectively. As shown more clearly in Figs. 4 and 7 to 9, delivery roller 47 is positioned below the delivery roller 48. The cylinder 46 and delivery roller 48 are formed with similar spaced annular peripheral grooves for receiving a pair of endless coil spring belts 49. As shown in Figs. 7 to 9, the belts 49 engage the periphery of the lower delivery roller 47, and also engage pick-up cylinder 46 and upper delivery roller 48 in the belt receiving grooves thereof. Mounted adjacent the delivery roller 47, above plate 21 and above the path of the grids 16, is a horizontal plate 50 forming a receiving table. The plate 50 is formed with a rectangular notch 50' as shown in Figs. 1 to 3. Referring to Fig. 1, the cone forming machine 17 has a cake receiving portion 17' which is positionable in substantially the same horizontal plane as the upper surface of the receiving table 50.

Referring to Figs. 5 and 6, the cylinder 46 is formed with a central cavity 51 which is closed by a semicircular shell 52, the latter being held in place by screws 53. A shaft 54 is rotatably mounted in the cylinder 46 parallel to the shaft 37 and offset radially therefrom, shaft 54 extending through the cavity 51 as shown in Fig. 6. An arm 55 is fixed to the shaft 54 within cavity 51, and arcuate pins 56, preferably three in number, are fixed to the arm 55. The shell 52 is formed with a slot 57 for each of the pins 56. The pins 56 can be withdrawn into the cavity 51 and within the periphery of cylinder 46 to the dot and dash line position of Fig. 6 by rotation of the shaft 54 in a clockwise direction as viewed in said figure. The shaft 54 extends through the bearing 34 and exteriorly of the cylinder 46. A crank arm 58 is fixed to the projecting end of said shaft, said arm carrying an eccentric shaft 59 on which a cam following roller 60 is mounted.

Fixedly mounted adjacent the bearing 34 and coaxial with the shaft 37 is a sleeve 61, into the open end of which the roller 60 projects. Mounted within the sleeve 61 are adjustable arcuate cam segments 62 and 63, which are positioned for engagement by the roller 60. The sleeve 61 is slotted, as at 64 and 65, to receive adjustment screws 66 and 67, which screws are threaded into the segments 62 and 63 respectively to lock the latter in a selected position. As shown in Fig. 6, the cam segments 62 and 63 overlap at one end and are spaced from one another at the other end. The cam following roller 60 engages the inner surfaces of the cam segments 62 and 63 as the cylinder 46 rotates, and when said follower moves into the area between the spaced ends of the cam segments, said roller moves radially outwardly to engage the inner surface of the sleeve 61. While the roller 60 is in engagement with the inner surface of the cam segments, the arm 55 and pins 56 are in the dot and dash line position of Fig. 6. The solid lines in Fig. 6 show the position of the arm 55 and pins 56 when the follower 60 engages the inner surface of sleeve 61 between the cam segments 62 and 63.

As previously mentioned, the movement of the grids 16 on supporting ring 15 is synchronized with the rotation of shaft 37 and cylinder 46. The cam segments 62 and 63 are so positioned and the timing of the roller 46 with respect to the grids 16 is such, that when the leading edge of a cake 68 reaches the position under the cylinder 46 shown in Fig. 7, pins 56 are projected through the slots 57 and piercingly engage a leading edge portion of the cake 68, peeling said cake from grids 16 and feeding the leading edge portion of said cake to the nip between belts 49 and roller 47 as shown in Fig. 8.

At this point, cam segment 62 is engaged by the follower 60 and the pins 56 are withdrawn into the slots 57, thereby stripping themselves from the cake 69 as shown in Fig. 8. As the cylinder 46, belts 49 and rollers 47 and 48 continue to rotate, the cake 68 is delivered onto the receiving table 50 as shown in Fig. 9. At the same time the supporting ring 15 continues to rotate, and by the time the leading edge portion of the cake on the succeeding grid 16 is positioned under the cylinder 46, the pins 56 are again projected as shown in Fig. 7 to repeat the pickup operation. In Fig. 1, a cake 68 is shown on the receiving table 50, and another cake 68 is shown with its leading edge portion moving under the pickup cylinder 46.

Referring now to Figs. 1 to 3, a bearing sleeve 69 depends from the outer end of the arm 33, and rotatably mounted in said sleeve is a shaft 70. A pulley 71 is fixed to the shaft 70 above the arm 33, and a plate 72 is fixed to the lower end of the shaft 70. The plate 72 is generally L-shaped as shown in Fig. 1, having an arm 73 and an arm 74, both extending in substantially the same horizontal plane as the receiving table 50, as shown in Figs. 2 and 3. The arm 74 is formed with upstanding spaced ears 75 and 76, which are bored to receive a pin 77. Fixed on the pin 77 between the ears 75 and 76 is a plate 78 forming an upper jaw which is complementary to the arm 74 and positioned thereabove. A generally U-shaped torsion spring 79 has its end portions fixed in suitable apertures in the lugs 75 and 76, and the central portion of said spring engages the upper surface of the jaw 78 in a manner to urge the latter downwardly. Fixed to the pin 77 outwardly of the lug 75 is an arm 80 which carries a roller 81 at its outer end. A similar arm 82 having a roller 83 is fixed on the other end of the pin 77 outwardly of ear 76.

A coiled tension spring 84 is fixed at one end to the periphery of the pulley 71 and extends around said pulley and has its other end fixed to arm 83 as at 85. Depending from the outer end of arm 73 of plate 72 is a shaft 86 on which a cylindrical roller 87 is rotatably mounted (see Figs. 2 and 3). The table 21 is formed with an arcuate slot 88 in which the roller 87 is slidably positioned. One end of the slot 88 is positioned adjacent the receiving table 50, and the other end is positioned adjacent the cone forming machine 17. Slot 88 diminishes in radius, with respect to the axis of shaft 31, from its left hand end to its right hand end as shown in Fig. 1. The plate 72 and the parts mounted thereon constitute a gripper mechanism, and when the arm 33 is positioned as shown in Fig. 1, the jaws 74 and 78 are positioned in the notch 51 of the receiving table 50. When the arm 33 swings toward the dot and dash line position of Fig. 1, roller 87 traveling in slot 88 causes clockwise rotation of plate 72, so that when the arm 33 reaches said dot and dash line position, the arm 74 of plate 72 is pointed at the cake receiving portion 17' of the cone forming machine.

Mounted on plate 21 adjacent to receiving table 50 and to one end of slot 88 is an upstanding bar 89 having a transverse arm 90 mounted on its upper end and extending inwardly over the slot 88. A cam member 91 is pivotally mounted on the inner end of the arm 90 in the path of movement of the roller 81. An L-shaped stop member 92 is fixed to the bar 89 and extends transversely inwardly to limit the pivotal movement of cam 91 in a clockwise direction as viewed in Figs. 2 and 3.

Adjacent the cone forming machine 17 and mounted on plate 21 is an angle member 93 having an upstanding flange 94, to which flange an angle member 95 is fixed, the latter having a horizontal flange 96 spaced above plate 21. The flange 96 is positioned for engagement by the roller 83 when the gripper is in the dot and dash line position of Fig. 1.

In the operation of the cake transferring mechanism, assuming that the arm 33 is positioned intermediate its arc of swinging movement, and is moved toward the receiving table 50 as a cake 68 is being deposited on said table, the gripper mechanism moves to the position of Fig. 3. In this position the roller 81 has moved under the cam 91 and is depressed thereby, rotating pin 77 and lifting jaw 78 as shown. Jaws 74 and 78 are now pointed into the notch 50' of receiving table 50, and jaw 74 is moving under the cake 68 while the jaw 78 simultaneously moves thereover. As the arm 33 continues to swing toward the limit of its travel, roller 81 moves out of contact with cam 91, and spring 79 snaps jaw 78 down onto cake 68 to firmly grip the latter as shown in Fig. 2.

Arm 33 is immediately swung in the reverse direction toward the dot and dash line position of Fig. 1, the cake 68 being transferred from the receiving table 50 to the dot and dash line position where an edge portion of said cake is received in the cake receiving portion 17' of one of the movable, conical forming units of the cake forming machine 17 by means of which the cake is moved off of the plate 21. Inasmuch as the unit 17 is of a type well known and forms no part of the present invention, it is not being described in detail herein. As the arm 33 approaches the dot and dash line position of Fig. 1, roller 83 engages the flange 96 and is depressed thereby to lift the jaw 78 and release the cake 68 as the latter is drawn into the cake forming machine 17. Upon release of the cake 68, arm 33 again swings back toward the solid line position of Fig. 1 to begin a new cycle. As the arm 33 so swings, roller 83 moves out of contact with flange 96, and spring 79 again closes jaw 78. Jaw 78 remains closed until the roller 81 reengages cam 91.

By the time the gripper mechanism again returns to the receiving table 50, the pickup mechanism has again delivered a cake 68 onto said table in position for engagement by the jaws of the gripper mechanism. Because of the common drive for the ring 15, pickup mechanism, swinging arm 33, and cake forming machine 17, all of the parts move in timed relationship so that the cakes from the grids 16 are automatically transferred to the cone forming machine 17 at the same rate that the grids 16 move under the pickup cylinder 46.

Various changes and modifications may be made without departing from the spirit of the invention, and all of such changes are contemplated as may come within the scope of the claims.

What I claim is:

1. In combination: a movably mounted support; a plurality of spaced baking grids positioned in sequential formation on said support; a rotatably mounted carrier positioned over said support and grids and rotatable on an axis which is transverse with respect to the direction of movement of the grids therebelow; at least one pin swingably mounted on said carrier on an axis within the carrier which extends in the same general direction as the axis of rotation of the carrier for movement from a retracted position within the carrier to a position where a portion projects from the carrier to piercingly engage a cake on a grid therebelow and peel said cake from said grid as the latter is moved and as said carrier is rotated; and means for controlling the movement of said pin.

2. In combination: a movably mounted support; a plurality of spaced baking grids positioned in sequential formation on said support; a rotatably mounted cylinder having a slotted periphery positioned over said support and grids and rotatable on an axis transverse with respect to the direction of movement of the grids therebelow; at least one pin swingably mounted in said cylinder for movement from a retracted position within said cylinder to a position where a portion projects through said slot and beyond the periphery of said cylinder to piercingly engage a cake on a grid therebelow and peel said cake from said grid as the latter is moved and as said cylinder is rotated.

3. In combination: a movably mounted support; a plurality of spaced baking grids positioned in sequential formation on said support; a rotatably mounted cylinder having a slotted periphery positioned over said support and grids and rotatable on an axis transverse with respect to the direction of movement of the grids therebelow; a shaft carried by said cylinder and spaced from and parallel with the axis thereof; and at least one pin swingably mounted on said shaft within said slot of said cylinder for movement from a retracted position to a position where a portion projects beyond the periphery of the cylinder to piercingly engage a cake on a grid therebelow and peel said cake from said grid as the latter is moved 4. In combination: a movably mounted support; a plurality of spaced baking grids positioned in sequential formation on said support; a rotatably mounted cylinder having a slotted periphery positioned over said support and grids and rotatable on an axis transverse with respect to the direction of movement of the grids therebelow; a shaft carried by said cylinder and spaced from and parallel with the axis thereof; at least one pin swingably mounted on said shaft within said slot of said cylinder for movement from a retracted position to a position where a portion projects beyond the periphery of the cylinder to piercingly engage a cake on a grid therebelow and peel said cake from said grid as the latter is moved and as said cylinder is rotated; a stationary cam mounted adjacent said cylinder; and a cam follower on said shaft in engagement with said cam for causing alternate projecting and retracting movement of said pin.

5. In combination: a movably mounted support; a plurality of spaced baking grids positioned in sequential formation on said support; a rotatably mounted cylinder having a slotted periphery positioned over said support and grids and rotatable on an axis transverse with respect to the direction of movement of the grids therebelow in timed relationship with the movement of said grids; a shaft rotatably carried by said cylinder which shaft is spaced from and parallel with the axis of the cylinder; an arm fixed to said shaft and projecting radially therefrom; and at least one arcuate pin fixed to said arm within said cylinder slot, said pin being of such shape that rotation of said shaft in one direction retracts said pin within said cylinder periphery and rotation in the opposite direction projects said pin from the cylinder periphery with the outer end portion of said pin arranged substantially concentric with said cylinder periphery to piercingly engage a cake on a grid therebelow and peel said cake from said grid as the latter is moved and as said cylinder is rotated.

6. In combination: a movably mounted support; a plurality of spaced baking grids positioned in sequential formation on said support; a rotatably mounted cylinder having a slotted periphery positioned over said support and grids and rotatable on an axis which is transverse with respect to the direction of movement of the grids therebelow, a shaft rotatably carried by said cylinder spaced from and parallel with the axis thereof; an arm fixed to said shaft and projecting radially therefrom; at least one arcuate pin fixed to said arm within said cylinder slot, said pin being of such shape that rotation of said shaft in one direction retracts said pin within said cylinder periphery and rotation in the opposite direction projects said pin from the cylinder periphery with the outer end position of said pin substantially concentric with said cylinder periphery to piercingly engage a cake on a grid therebelow and peel said cake from said grid as the latter is moved and as said cylinder is rotated; a stationary cam mounted adjacent said cylinder; and an eccentric cam follower on said shaft in engagement with said cam for causing alternate projecting and retracting movement of said pin.

7. In combination: a movably mounted support; a plurality of spaced baking grids positioned in sequential formation on said support; a rotatably mounted cylinder having a slotted periphery positioned over said support and grids and rotatable on an axis which is transverse with respect to the direction of movement of the grids therebelow; at least one pin swingably mounted on said cylinder for movement from a retracted position within said cylinder to a position where a portion projects through said slot and beyond the periphery of said cylinder to piercingly engage a cake on a grid therebelow and peel said cake from said grid as the latter is moved and as said cylinder is rotated; a delivery roller adjacent said cylinder; a receiving table adjacent said delivery roller; and a delivery belt extending around said cylinder and in engagement with the periphery of said delivery roller, the nip between said roller and belt being positioned to receive the leading edge portion of a cake engaged by said pin.

8. In combination: a movably mounted support; a plurality of spaced baking grids positioned in sequential formation on said support; a rotatably mounted cylinder having a slotted periphery positioned over said support and grids and rotatable on an axis which is transverse with respect to the direction of movement of the grids therebelow; at least one pin swingably mounted on said cylinder for movement from a retracted position within said cylinder to a position where a portion projects through said slot and beyond the periphery of said cylinder to piercingly engage a cake on a grid therebelow and peel said cake from said grid as the latter is moved and as said cylinder is rotated; a delivery roller adjacent said cylinder; a receiving table adjacent said delivery roller; a delivery belt extending around said cylinder and in engagement with the periphery of said delivery roller, the nip between said roller and belt being positioned to receive the leading edge portion of a cake engaged by said pin; and means for retracting said pin into said slot when the cake engaged by said pin reaches the nip between said roller and belt, to strip said pin from said cake as said cake is being delivered by said belt and roller onto said table.

9. In combination, a movably mounted support, a plurality of spaced baking grids positioned in sequence on said support, a rotatable cylinder positioned over said sequence of grids and rotatable on an axis which extends transversely of the direction of movement of the grids, stripping means carried by said cylinder and movable relative thereto and coacting with said cylinder to peel baked cakes from successive grids, and means coacting with said cylinder and stripping means for successively removing said cakes from said cylinder.

10. In combination, a movably mounted support, a plurality of spaced baking grids positioned in sequence on said support, a rotatable cylinder positioned over said sequence of grids and rotatable on an axis which extends transversely of the direction of movement of the grids, means including a projectible and retractable stripping member carried by said cylinder and coacting with said cylinder to peel baked cakes from successive grids, and means coacting with said cylinder and stripping member for successively removing said cakes from said cylinder.

11. In combination, a movably mounted support, a plurality of spaced baking grids positioned in sequence on said support, a rotatable cylinder positioned over said sequence of grids and rotatable on an axis which extends transversely of the direction of movement of the grids, means including a projectible and retractable stripping member mounted inside of said cylinder and coacting with said cylinder to peel baked cakes from successive grids, and means coacting with said cylinder and stripping member for successively removing said cakes from said cylinder.

12. In combination, a movably mounted support, a plurality of space baking grids positioned in sequence on said support, a rotatable cylinder positioned over said sequence of grids and rotatable on an axis which extends transversely of the direction of movement of the grids, means including a projectible and retractable stripping member carried by said cylinder and coacting with said cylinder to peel baked cakes from successive grids, and means coacting with said cylinder and stripping member for successively removing said cakes from said cylinder, said stripping member being curved to project arcuately in the general direction of rotation of the cylinder when it is in projected position.

13. In combination, a movably mounted support, a plurality of spaced baking grids positioned in sequence on said support, a receiving table above said support, said sequence of grids being movable one after another past said receiving table, a rotatable peeling cylinder positioned over said sequence of grids and rotatable on an axis which extends transversely of the direction of movement of the grids, stripping means carried by said cylinder and movable relative thereto and coacting with said cylinder to peel baked cakes from successive grids, and means coacting with said peeling cylinder and stripping means for successively transferring said cakes from the peeling cylinder to said receiving table as said grids are moved past said table.

14. In combination, a movably mounted support, a plurality of spaced baking grids positioned in sequence on said support, a receiving table above said support, said sequence of grids being movable one after another past said receiving table, a rotatable peeling cylinder positioned over said sequence of grids and rotatable on an axis which extends transversely of the direction of movement of the grids, stripping means carried by said cylinder and movable relative thereto and coacting with said cylinder to peel baked cakes from successive grids, and means including at least one delivery cylinder coacting with said peeling cylinder and stripping means for successively transferring said cakes from the peeling cylinder to said receiving table as said grids are moved past said table.

15. In combination, a movably mounted support, a plurality of spaced baking grids positioned in sequence on said support, a receiving table adjacent said support, said sequence of grids being movable one after another past said receiving table, a rotatable peeling cylinder positioned over said sequence of grids and rotatable on an axis which extends transversely of the direction of movement of the grids, stripping means carried by said cylinder and movable relative thereto and coacting with said cylinder to peel baked cakes from successive grids, endless means movable on said peeling cylinder and having a stretch movable away from said cylinder, and a rotatable delivery cylinder positioned for cooperation with said endless means for successively transferring said cakes from the peeling cylinder to said receiving table as said grids are moved past said table.

16. In combination, a support, a plurality of spaced grids positioned in sequence on said support, said support being movable to cause progressive movement of said grids, a rotatably mounted cylinder positioned above said grids and rotatable on an axis which extends transversely of the direction of movement of the grids, a cake engaging element mounted in said cylinder on an axis within said cylinder which extends in the same general direction as the axis of rotation of the cylinder for movement from a confined position within said cylinder to a position where it projects externally from the periphery of the cylinder, said carrier being so positioned that when said cake engaging element is projected it will engage a cake and cause said cake to be transferred from said grid to said rotatable cylinder, and means for removing the cakes one after another from said cylinder.

17. In combination, a movably mounted support, a plurality of spaced baking grids positioned in sequence on said support, a rotatable peeling cylinder positioned over said grids and transversely of the direction of movement thereof, means on said peeling cylinder for peeling baked cakes from successive grids and for transferring the same to said peeling cylinder, a delivery cylinder mounted adjacent said peeling cylinder on an axis which is parallel to the axis of rotation of said peeling cylinder, endless belt means rotatable with said peeling and delivery cylinders and having a stretch which leaves said peeling cylinder and forms a bite with said delivery cylinder to remove cakes from the peeling cylinder, and means for receiving cakes one after another from said delivery cylinder.

18. In combination, a movably mounted support, a plurality of spaced baking grids positioned in sequence on said support, a rotatable peeling cylinder positioned over said grids and transversely of the direction of movement thereof, means on said peeling cylinder for peeling baked cakes from successive grids and for transferring the same to said peeling cylinder, a pair of delivery cylinders mounted adjacent said first cylinder on an axis which is parallel to the axis of rotation of said first cylinder, delivery belt means rotatable around said peeling cylinder and one of said delivery cylinders and having a stretch which leaves said peeling cylinder and which forms a bite with the other of said delivery cylinders to remove cakes from the peeling cylinder, and means for receiving cakes one after another from said delivery cylinders.

19. In combination, a notched support for a cake or the like, a transfer arm pivotally mounted on a vertical axis for oscillatory movement to and from said support, cake gripping mechanism pivotally mounted on the outer end of said arm on an axis which is parallel to the axis of pivotal movement of the arm, said gripping mechanism being so located on said arm that the gripping mechanism is in registration with the notch of said support when the arm is in one extreme position of oscillatory movement, means for causing pivotal movement of said gripping mechanism on said arm to cause said gripping mechanism to face said notch when the arm is in said first-mentioned position and to face a different position when it is in the other extreme position of oscillatory movement, and means for causing said gripping mechanism to grip a cake which is in said first-mentioned position.

References Cited in the file of this patent

UNITED STATES PATENTS

| Number | Name | Date |
|---|---|---|
| 1,350,859 | Drouillard | Aug. 24, 1920 |
| 1,652,375 | Sabbag | Dec. 13, 1927 |
| 1,804,039 | Tatosian | May 5, 1931 |
| 1,808,997 | Schroeder et al. | June 9, 1931 |
| 1,811,832 | Mayers | June 23, 1931 |
| 2,321,634 | Tatosian | June 15, 1943 |